United States Patent [19]
Hradcovsky et al.

[11] 3,883,743
[45] May 13, 1975

[54] FILM NEGATIVE DISPLAY SYSTEM

[76] Inventors: Rudolf J. Hradcovsky; Adriena M. Hradcovsky, both of 27 W. Beech St., Long Beach, N.Y. 11561

[22] Filed: Dec. 13, 1973

[21] Appl. No.: 424,207

[52] U.S. Cl. .................................. 250/329; 250/483
[51] Int. Cl. ............................................ G01n 21/34
[58] Field of Search ............................. 250/329, 483

[56] References Cited
UNITED STATES PATENTS

| | | | |
|---|---|---|---|
| 2,728,870 | 12/1955 | Gungle et al. ................... | 250/483 X |
| 3,028,492 | 4/1962 | Goerz et al. ........................ | 250/329 |
| 3,040,202 | 6/1962 | Lehmann .......................... | 250/483 |
| 3,085,154 | 4/1963 | Kelsh .............................. | 250/329 X |
| 3,133,194 | 5/1964 | Watson et al. ...................... | 250/329 |

*Primary Examiner*—Archie R. Borchelt
*Attorney, Agent, or Firm*—Kenyon & Kenyon, Reilly, Carr & Chapin

[57] ABSTRACT

The system includes an enlarger which is adapted to carry an ultraviolet light source and a phosphor coated plate. The system causes ultraviolet light to be shed on the plate in order to make the coating become luminescent. In addition, the enlarger is equipped to project infra-red light through a negative onto the activated plate to produce a reverse image of the negative. The system is based upon the quenching phenomena of flourescent materials in which the infra-red light passing through the white areas on the negative forms a corresponding black area on the activated plate by quenching out the effect of the ultraviolet light on the plate in these areas. The infra-red light does not pass through the black areas of the negative so that the corresponding areas on the activated plate remain luminescent. The system allows the enlarger to move in order to vary the size of the projected positive image.

The source of ultraviolet light is maintained in the range of about 4 to 6 watts while the infra-red light is maintained in a range of from 30 to 200 watts. In addition, the intensities of the two light sources on the activated plate remains substantially equal.

16 Claims, 8 Drawing Figures

FILM NEGATIVE DISPLAY SYSTEM

This invention relates to a film negative display system.

As is known, for example, from British Pat. No. 205,152, processes have been known for photographic reproduction which utilize phosphorescent mediums. These processes are based upon the knowledge that phosphorescent substances have the property that when activated by exposure to actinic radiations, their phosphorence is dissipated by exposure to non-actinic light. For example, phosphorescent zinc sulphide which glows brightly after exposure to daylight, X-rays or other source of actinic radiation, is rapidly rendered non-luminous when exposed to red light. These types of processes generally produce a phosphorescent image of the object to be photographed on a phosphorescent screen by first activating the whole screen by exposure to actinic radiations and then forming the image by means of non-actinic light. Subsequently, a photographic image is produced by placing the screen in contact with a sensitive photographic surface. The photographic image obtained is a positive. In the case of a transparency, the exposure to non-actinic light is made through the transparency. The opaque parts of the transparency protects the coating on the screen immediately beneath from the dissipating effect of the non-actinic light while the lighter parts of the transparency allow the dissipating effect of the non-actinic light to reach the coating to dissipate its phosphorence. The coating has a phosphorence image which is a negative of the original. This is then used to produce a positive photograph image with a sensitive photographic surface.

Contact-type printing arrangements have also been known, e.g., as in U.S. Pat. No. 1,966,322, in which a continuous reel of negative film and a continuous reel of positive film are placed in mutual contact and passed through a printing gate. In addition, a source of light is placed on one side of the gate to excite flourescence on a screen of flourescent material, for example, zinc sulphite, while a source of infra-red light is positioned on the other side to pass non-actinic radiation through a suitable filter, the positive and the negative to the flourescent screen. This non-actinic light causes decay of the flourescence of the screen thereby controlling the exposure given to the positive film in accordance with the density of the negative film.

A technique is also known from U.S. Pat. No. 2,482,815 wherein a layer of phosphor is excited uniformly with ultraviolet light. This excited phosphor layer, after the first momentary and spontaneous phosphorescent has died away, which may require a few seconds or a few minutes, is placed in printing relation — either through contact or projection printing — to a layer of photo-sensitive material which is sensitive to the intermediate wave length which will be emitted by the phosphor when stimulated by infra-red light. The spontaneous phosphorence must be allowed to die away to the point where it is insufficient to expose the photographic layer at least during the time that it is to be in contact therewith. This time is referred to as relaxation time. While the phosphor layer is held in printing relation to the photo-sensitive layer, an image in the infra-red light is focused on the phosphor layer which thus is stimulated and releases wave lengths of intermediate radiation which, in turn, exposes the photosensitive layer. The photosensitive layer is then processed to a photographic record in the usual way.

Other types of photographic printing apparatus are also known, e.g., as in U.S. Pat. Nos. 2,988,978 and 3,166,998 and which utilize phosphorescent materials as a light source.

In general, in the art of projection printing, use is made of an enlarger to project an image of a negative onto a photosensitive printing paper so that a positive print can be made. In many cases, these enlargers are equipped with red light filters which can be moved into the path of a projected image in order to prevent printing while the printing paper is being positioned in place. The filters are moved out of the path of the projected image when a print is being made. Generally, these enlargers can be manipulated in order to change the size of the projected image so as to obtain different size prints from a single negative.

From British Pat. No. 509,308, it is also known that photographic negatives can be projected to be viewed as positives. In this case, an infra-red light source is used to project an infra-red image of a negative onto a screen. The screen, in turn, is coated with a substance which exhibits flourescence under the influence of ultraviolet light. In addition, one or more ultraviolet lamps are placed outside the angle of view of the projection lens for exciting the luminescent screen in an even manner. The intensity or quantity of ultraviolet light impinging upon the screen is controlled and the intensity of the infra-red illumination may also be controlled. The entire apparatus is mounted in a closed cabinet or housing with viewing being permitted through a hooded opening. The apparatus may also be used to project an enlarged form of a negative although there is no provision for changing the size of the projected image. Further, the apparatus is limited to use with black-and-white negatives and is not useful for color negatives.

Heretofore, for example, in the case of a commercial photographer, where one has a number of negatives taken of a particular subject and it is desirable to select one or another of the negatives for printing a high quality positive print, proofs have usually been made of all the negatives. Once having these proofs, a determination can be made as to which, if any, of the negatives should be used for printing a high quality positive. Such a technique is, however, time consuming and expensive.

Accordingly, it is an object of the invention to reduce the time required to obtain a high quality print from one of a series of negatives.

It is another object of the invention to provide a negative display system which can be readily manipulated in a dark room to obtain positive images of negatives for evaluation.

It is another object of the invention to readily and quickly view the images of negatives in a positive image format.

It is another object of the invention to view a color image of a color negative with genuine color values of a negative.

It is another object of the invention to provide a phosphor of high sensitivity which is activated to luminesence by ultraviolet light.

It is another object of the invention to view a negative image in a positive image form under high clarity conditions.

It is another object of the invention to provide a system for viewing color negatives in a black-and-white positive image.

Briefly, the invention is directed to a system in which a series of negative prints can be viewed in the positive form in a rapid manner so that the best of the negatives can be selected for subsequent printing operations. To this end, the system uses an apparatus for visualization of a positive image of a black-and-white negative on a photosensitive plate coated with a luminescent material of high sensitivity and means for producing a photographic enlargement on the plate of the positive image of variable size. The apparatus includes a source of ultraviolet light for activating the surface of the sensitive plate, an infra-red light source for projecting light through a negative to the plate and an infra-red filter for filtering through infra-red light passing through the negative onto the plate to quench luminescence of the plate to black out the areas thereon corresponding to the white areas of the negative.

The means for producing a variable image includes a support frame and means for adjustably mounting the apparatus for producing the positive image, e.g., in a vertical plane. A housing is also used to mount the two light sources in fixed relation to each other to ensure an equal intensity of light from both sources on the plate. In this latter respect, the infra-red light and the ultraviolet light need not be of equal value but rather the ratio of their respective values remain substantially constant during use of the system. As a parameter, the ultraviolet light is of a minimum intensity for obtaining a maximum luminescence of the plate. As another parameter, the infra-red light is of a minimum value for quenching, depending in part on the sensitivity of the coating on the plate.

When utilzing the system, one negative of a series is placed within the housing and thereafter, with the infra-red filter in place, light is passed through the negative and filter while ultraviolet light is shed on the luminescent plate. The combination of ultraviolet light and infra-red light, as is known, causes a quenching effect to take place so that the image appearing on the photosensitive plate is a reverse image of the negative, that is, a positive image. Due to the particular high quality of the coating on the plate, the positive image appears as it would on a print. Should the image be acceptable, the negative from which the image is made can then be used for printing purposes in any known manner. If the image is not acceptable, the negative can be removed and the next negative of the series inserted for viewing purposes.

In accordance with the system, the size of the image projected onto the photo-sensitive plate can be varied. In this respect, the source of ultraviolet light and the source of infra-red light are both closely inter-related to maintain a substantially uniform ratio with respect to each other, i.e., 1 to 1, in the amount of light shed on the photosensitive plate. For example, for a particular spacing of the two light sources of about 8 inches, and a conventional spacing of the lens from the coated plate, the ultraviolet light source is a UV bulb of from 4 to 6 watts while the infra-red light source is a halogen lamp of from 30 to 200 watts. It is to be noted that a high energy lamp should not be used for the IR light since the negative could well be burned or otherwise damaged by the generated heat unless cumbersome cooling equipment is used.

In addition to projecting black-and-white positive images from a black and white negative, the system may also be utilized in other manners. For example, a black-and-white positive image can be made of a color negative. To this end, the luminescent material used for the coating has two maxima of wave length in its infra-red spectrum that quench luminescence of material to the maximum degree; one is at about 0.9 microns and the second is at about 1.3 microns. In addition, the filter is replaced by a two-part filter arrangement. One part of the filter arrangement is a filter that lets in infrared radiation between 0.5 microns and 1.0 microns such as the Schott Filter B6 17. This type of filter absorbs almost all infra-red radiation of wave lengths longer than 1.0 microns. The second part is made of a filter that filters off the visible part of the spectrum and passes radiations a wave length longer than approximately 0.7 microns such as Kodak Filter No. 24 A, projection red. By combining these two filters, only a very narrow band of the infra-red spectrum is able to pass through, that is, from 0.7 microns to 1.0 microns; the maximum being about 0.9 microns. During operation, the visible and infrared light that is emitted by a source is absorbed by the organic dyes normally contained in the emulsion of a color negative except for the radiation of a wavelength longer than approximately 0.9 microns which passes through. The degree of absorption is contingent upon the density of a negative and is akin to the same phenomena as the absorption of light on a black-and-white negative. The light that passes through a negative then passes through the two filters. As a result, only a narrow band of the infra-red spectrum can pass through the filters, i.e., the light of a wave length between 0.7 microns and 0.1 microns. This light has a maximum quenching effect on the luminescent material and quenches out the white areas on the plate.

In another embodiment, the true colors of a color negative can be visualized. This is accomplished by eliminating the effect of the usual dark brown - orange cast of the negative which so dominates the other colors that these other colors become indiscernible. In accordance with the invention, the infra-red filter of the first mentioned embodiment is replaced by a blue filter. Upon projecting the image of a color negative through the blue filter onto an activated luminescent plate, a negative image will be produced in true negative colors. The blue filter has a light blue tone and lets through all visible spectrums with the orange to red portions of the spectrum being particularly absorbed. As light is projected through the negative onto the plate, all visible light and some parts of the orange and red spectrum pass through the filter and mix up with the yello-green light which is emitted by the plate. By the process of addition of these colors, the genuine colors contained in the color negative are obtained including white.

The material from which the coating of the photosensitive plate is made is of such sensitivity as to produce a high quality luminescent image which corresponds to an image which would be printed upon high quality printing paper. To this end, the coating is made up of zinc sulphide with slight traces of activated copper chloride or nitrate and activated cobalt chloride or nitrate. The ingredients are similar to those products already known on the market. However, such known products require relatively long periods of time to become excited and to dissipate. Because of this, very weak images are produced. For example, one known product takes approximately 1 minute to excite under an ultraviolet lamp of 4 watts while also taking about 20 seconds to dissipate. The product of the invention takes about 2 seconds to activate with the same ultraviolet light and about 3 to 5 seconds to disappear. The product is made up essentially of pure zinc sulphide with the copper and cobalt chlorides or nitrides being provided in the form of nitrates ($NO_3$) or chloride in trace amounts. For example, the copper nitrate is in the range of from $10^{-3}$ to $10^{-4}$ percent with the cobalt being in a concentration of $10^{-4}$ to $10^{-5}$ percent.

These and other objects and advantages of the invention will become more apparent from the following detailed description and appended claims taken in conjunction with the accompanying drawings in which:

FIG. 5 illustrates an exploded view of the negative mounting plate;

FIG. 6 illustrates a fragmentary view of a further embodiment of the invention utilized to project black and white images of color negatives;

Figure 7:
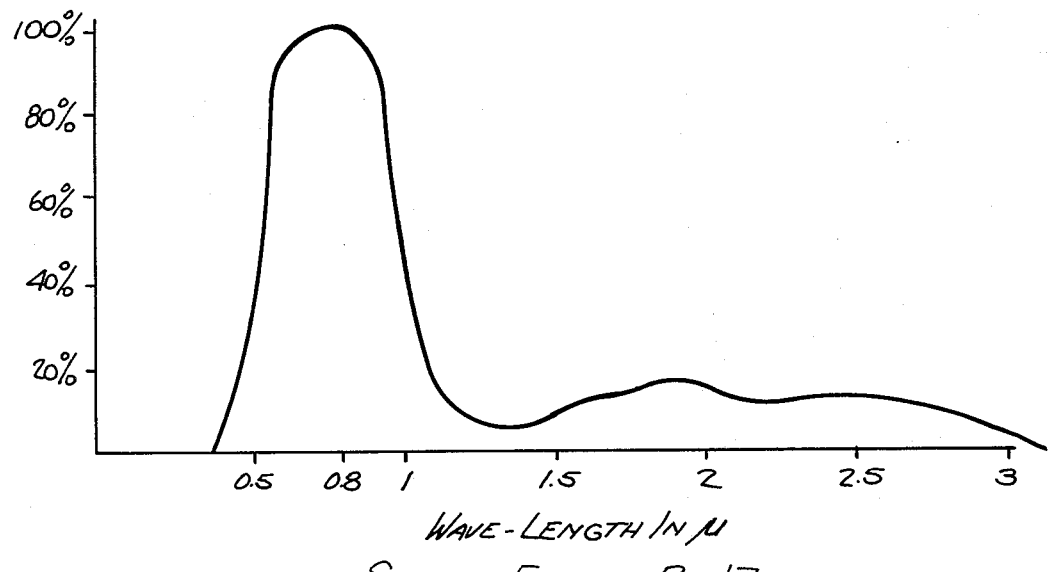
Figure 8:
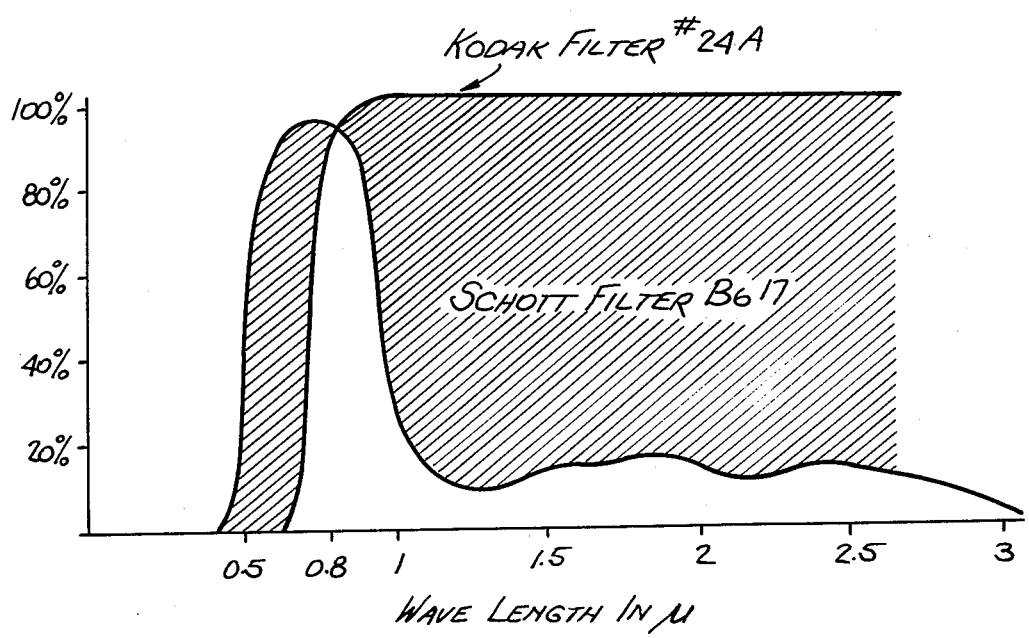

FIG. 7 graphically illustrates a representation of the type of light filtered through a filter utilized with the embodiment of FIG. 6; and FIG. 8 graphically illustrates a composite effect of the two filters of the embodiment of FIG. 6.

Figure 1:
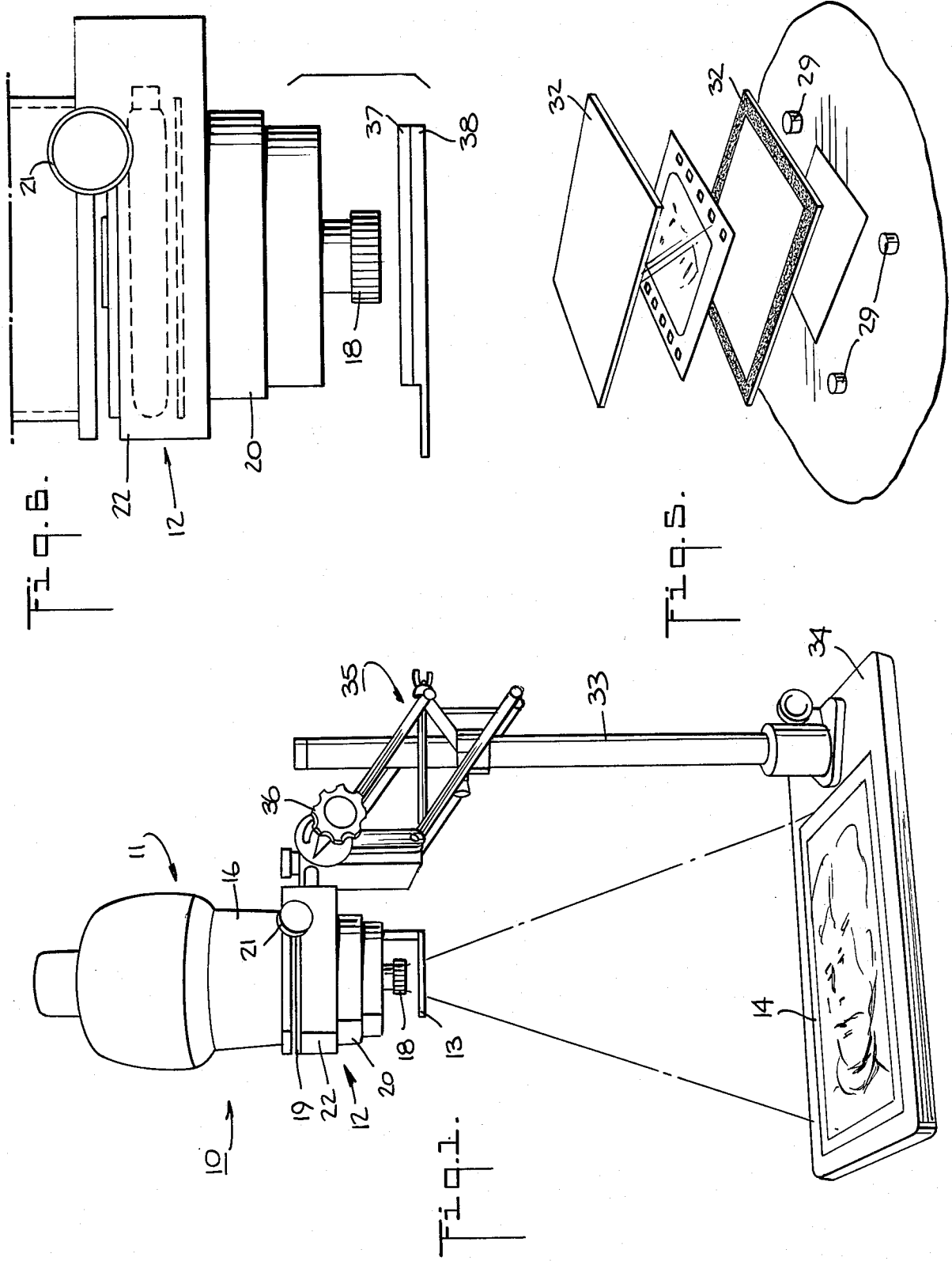
FIG. 1 illustrates a perspective view of a system according to the invention utilizing an enlarger, a luminescent plate, a source of ultra-violet light mounted on the enlarger and an infra-red filter.

Referring to FIG. 1, the viewing or visualization apparatus 10 includes an enlarger 11 of substantially standard construction, a means 12 containing a source of ultraviolet light mounted on the enlarger 11, an infra-red filter 13 mounted on the enlarger 11 and a photosensitive luminescent plate 14.

Figure 2:
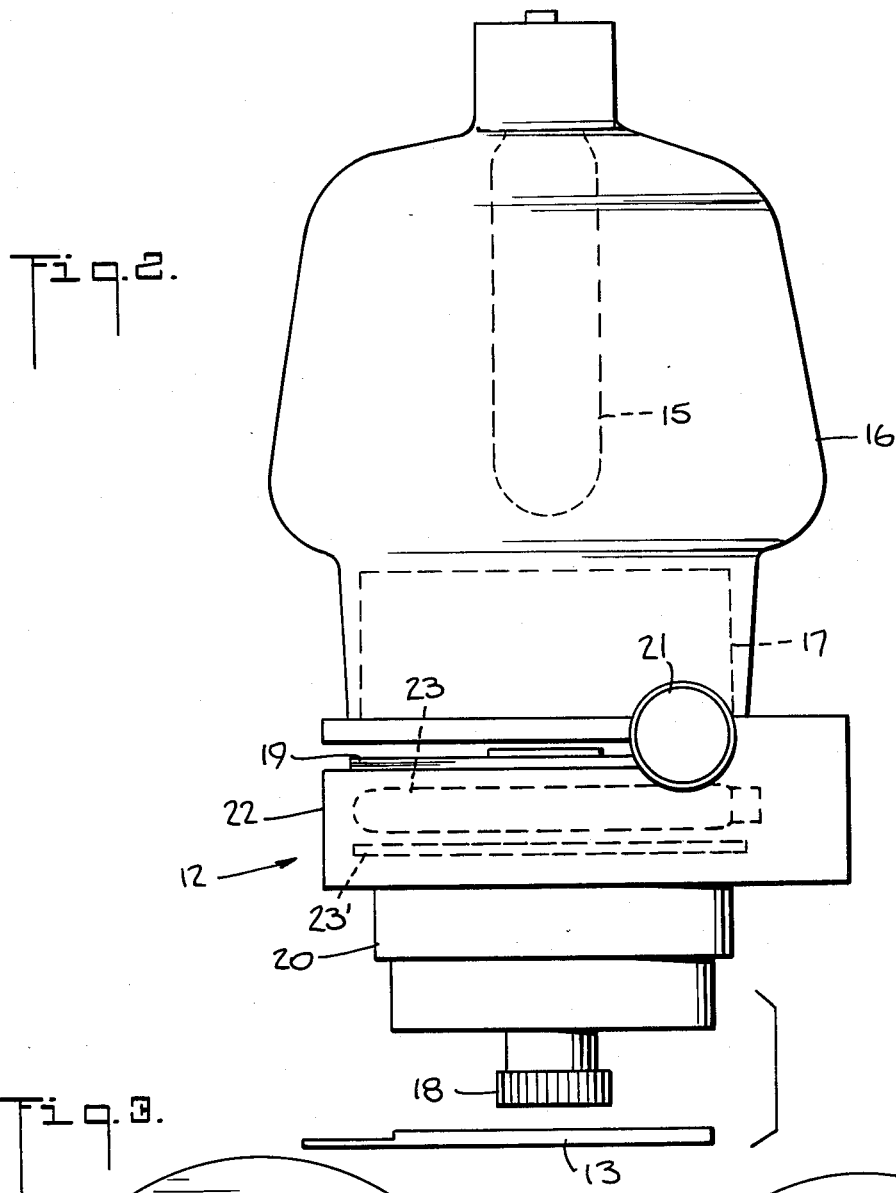
FIG. 2 illustrates an enlarged view of the enlarger, the infra-red lamp within the enlarger and the ultra-violet light source mounted on the enlarger.

Referring to FIG. 2, the enlarger 11 includes a source 15 of visible and infra-red light such as a halogen lamp of 30 watts to 200 watts mounted in an upper portion of a vertically oriented housing 16 of the enlarger 11. In addition, a condenser 17 of conventional structure is mounted below the halogen lamp 15 and an optical lens 18 is mounted below the condenser 17. A negative holder 19 is mounted between the condenser 17 and optical lens 18 in a stationary manner within the housing 16.

The optical lens 18 is mounted within a suitable focusing mechanism 20 to be adjustable in a vertical manner via a suitable adjusting knob 21 with respect to the housing 16 to focus the image of a negative being projected.

The means 12 containing the ultra-violet light source includes a suitable hood-like frame 22 which is secured on the housing 16 in order to be movable therewith. This frame 22 houses an ultraviolet lamp 23 of 4 W to 6 W which is mounted to direct light only towards the plate 14. A suitable ultraviolet filter 23' is also incorporated in the housing 22 in front of the lamp 23 to ensure that only ultraviolet light and not monochromatic light is directed towards the sensitive plate 14.

The infra-red filter 13 is mounted in a pivotal manner on a bracket 24 depending from the lens mounting frame 20 so as to move into and out of the projection path of a negative. The filter 13 itself is one which allows infra-red light of wave lengths from 0.8 microns to about 3.0 microns to pass through, such a filter is known as a permanent gelatin filter under the name Naphtol Green B.

An ordinary red filter (not shown) is also mounted in depending relation from the housing 16 in a manner similar to that as for a standard type of commercially available enlarger and for similar purposes.

Figure 3:
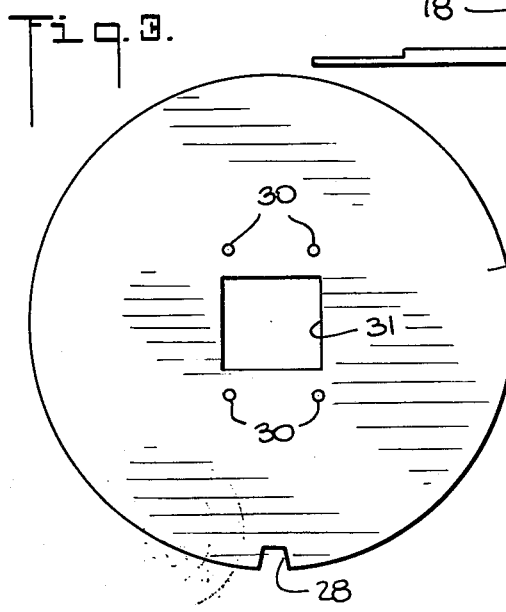
FIG. 3 illustrates a negative mounting plate.
Figure 4:
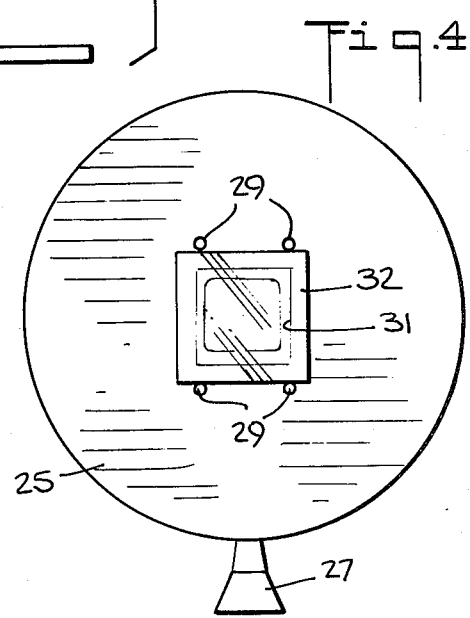
FIG. 4 illustrates a matching plate which cooperates with the plate to FIG. 3 to mount a negative.

Referring to FIGs. 3, 4 and 5, the negative holder 19 includes a pair of plates 25, 26, for example, of circular shape which can be slid into and out of the housing 16 through a suitable opening in order to position a negative in the path of light from the lamp 15. One plate 25 (FIG. 4) is provided with a short handle 27 for grasping purposes while the other plate 26 (FIG. 3) is provided with a notch 28 to accommodate the handle 27. Both plates 25, 26 are provided with suitable matching means such as pins 29 on one plate (FIG. 4) and holes 30 on the other plate (FIG. 3). In addition, each plate 25, 26 is provided with an aperture 31 in the center, for example, a rectangular aperture and a piece of glass 32 is mounted over each aperture. The glass 32 can be mounted by any suitable means on the respective plates 26, 27, for example, by a drop of adhesive. The plates 25, 26 and the glass inserts 32 serve to sandwich a negative therebetween for mounting purposes with the housing 16. The glass further serves to dissipate the heat generated by the lamp 15 so as to prevent damage to the mounted negative.

The arrangement of the light source 15, condenser 17 and lens 18 is such as to concentrate the light from the light source 15 into the lens 18. In this way, all of the available energy from the light source 15 is used in projecting the image of the mounted negative onto the sensitive plate 14. Where the negatives to be displayed are of 35 millimeter size, the lens 18 may be of the 40 to 70 millimeter (mm) type.

Referring to FIG. 1, the plate 14 is made of any suitable shape and is provided with a coating of luminescent material which is activated by ultra-violet light and is particularly sensitive to ultra-violet light of a wave length of 0.365 microns. The luminescent material is made of essentially zinc sulphide.

In order to produce the zinc sulphide of the invention, the following steps are carried out.

First, a co-activator such as sodium chloride is obtained in a pure form. Thereafter, a 2% solution of the sodium chloride is prepared. Next, zinc sulphide in a pure state is added to the solution in an amount of 5 grams per liter and a resultant solution is subjected to decantation and sedimentation in order to remove heavy material such as iron which would form sulphides. The remaining 2% solution of sodium chloride is mixed with copper and cobalt in the form of nitrates or chlorides to produce an activator.

In order to prepare the copper and cobalt chlorides a solution of each is made up containing 1 milligram of each chloride per liter. Care is taken to ensure that there is no spectroscopic trace of nickel in each solution. Thereafter, 100 milliliters of each chloride solution is added to one liter of the sodium chloride solution within a polished plastic labware beaker.

Thereafter, 100 grams of pure zinc sulphide and 100 milliliters of solution (sodium chloride, copper chloride and cobalt chloride) are mixed together to obtain a slurry. The slurry is then mixed and dried at about 100°C at reduced pressure in order to obtain a powder. The powder is then placed in a tube and is heated vertically within an electric oven. This step is carried out for about 25 minutes at a temperature of 900°C. The tube is then removed and cooled rapidly.

Subsequently, the powder is ground in a mortar and is dispersed in distilled water in order to extract the sodium chloride. Care is taken not to expose the powder to light, hence, these operations can be carried out under yellow light. The extraction of the sodium chloride can be done by a sediment/decantation method which is repeated one or two times.

A check can then be run with silver nitrate for the presence of a free chloride. In this regard, it is noted that the copper chloride and cobalt chloride will have entered into the crystalline structure of the zinc sulphide while in the furnace.

Next, a warm gelatin solution (30° to 40°C) having a 40% concentration, that is 200 grams per 500 milliliters of water is made. One hundred grams of the powder is then added to this 500 milliliter gelatin solution and additional water is added to obtain 10 liters. The resultant solution is stirred to obtain a suspension and thereafter a glass plate prepared with water glass or an aluminum plate with a matte non-reflective surface is coated with the resultant suspension by sedimentation. Other types of plates, for example, plastic plates, wood, etc., can be used to receive a coating of the solution. The thickness of the layer of luminescent material on the plate is sufficient so that one cannot see through the layer. To this end, the thickness should be at least ten microns thick.

The initial plate prior to coating can be varnished or lacquered with a white coating in order to reflect light back into the deposited coating. This gives about 10% better image than if the plate were untreated. If a black coating were used initially on the plate, a better contrast is obtained.

Various types of techniques can be used to coat a plate with the zinc sulphide suspension, for example, silk screening and spray processes can be used. Also, various other types of solutions can be used instead of the gelatin solution, for example, nitro cellulose and epoxy solutions can be used. Also, fillers can be used, if required. The coating produced in accordance with the above technique has certain advantages in that such produces smaller crystals and less graininess than previously known powders. To this end, it appears critical that the range of temperature in the oven should be between 800°C and 900°C although a temperature up to 1,000°C may be used. It is believed that a temperature over 1,000°C will produce a different crystalline structure. If the temperature falls below 800°C, the cobalt will not enter into the crystalline structure; similarly, under 400°C and the copper will not enter into the crystalline structure.

In order to visualize a positive image of a black-and-white negative, the negative is first mounted in the holder 19. Next, the UV light source 23 is turned on; the ultraviolet light falling on the plate 14 thus activates the luminescent coating. Next, the negative holder 19 is inserted in the housing 16. If the infra-red filter 13 is not in the path of the light from the light bulb 15, a negative image will appear on the plate 14 corresponding to the image of the negative. However, once the filter 13 is moved into the path of the light from the light bulb 15, the projected image reverses to show a positive image.

In order to produce a photographic enlargement of the positive image of variable size, a means is provided to move the apparatus 10 relative to the plate 14. This means includes an upstanding post 33 which is secured to a table 34 on which the plate 14 rests as well as an articulated linkage 35 which connects the housing 16 to the post 33. This linkage 35 is manually operated, or otherwise, via an adjusting knob 36 to move the housing 16 vertically relative to the plate 14. This allows the projected image on the plate to be varied in size. In addition, the focusing mechanism 20 is manipulated to bring the enlarged image into focus. During focusing, the position of the housing 16 remains unchanged.

The ratio of light intensities falling on the plate 14 from the ultraviolet light source and the infra-red light source are maintained at substantially equal ratio. Since both the ultraviolet light source 15 and the infra-red light light source 23 are fixedly mounted on the housing 16, the intensities remain substantially the same as the housing 16 is moved up and down.

Referring to FIG. 6, wherein like reference characters indicate like parts as above, in another embodiment, the system can be used to project black-and-white positive images of color negatives. In this case, instead of using a single infra-red filter as above, a composite pivotally mounted filter made up of two separate filters 37, 38 is used. One filter 37 is of the type which absorbs almost all infra-red radiation of wave lengths longer than 1.0 microns such as a Schott Filter B6 17. As shown in FIG. 7, such a filter 37 lets through infra-red radiation about between 0.5 microns and 1.0 microns. Higher wave lengths may also pass, however, such are of relatively small percentages. The second filter 38 is a filter that filters off the visible part of the spectrum and lets through radiations of wave lengths longer than 0.7 microns such as Kodak Filter No. 24, projection red. The two filters 37, 38 are both mounted within the projection path so that the second filter 38 removes the infrared radiation of wave lengths longer than 1.0 microns while the first filter 37 removes visible light as shown in FIG. 8. As a result, only light falling in the infra-red spectrum of 0.7 to 1.0 microns can be passed through with maximum values occuring at 0.9 microns.

As is known, photographic color negatives have organic dyes in their emulsions. These dies absorb infra-red light of wave lengths between 0.6 and 0.9 microns. Thus, when such color negatives are inserted in the housing 16, and the filters 37, 38 moved into the light path, only infra-red light of wave lengths between 0.7 and 1.0 microns pass through the filters 37, 38 onto the activated plate (not shown). This light has a maximum quenching effect on the luminescent material on the plate and quenches out the light areas on the plate.

In order to visualize the true colors of a color negative a blue filter is utilized in place of the infra-red filter of FIG. 1. This will produce a negative image in true negative color. Generally, the blue filter has a light blue tone and lets through all visible spectrum while the orange to red portions of the spectrum are partially absorbed. When light from the source 15 (FIG. 2) is projected through a color negative onto the plate 14 (FIG. 1), all visible light and some part of the orange and red spectrum passes through the filter and mixes up with the yellow-green light emitted by the plate 14. By the process of addition of these colors, the genuine colors contained in the color negative are produced. Since the usual dark brown - orange cast which dominates color negatives is eliminated, the remaining colors become quite discernible.

The invention thus provides a system which is particularly useful to amateur and commercial photographers in selecting negatives for the development of high quality prints. The invention also provides a system in which positive images of a negative can be displayed in a condition corresponding to a high quality positive print and in which such images can be enlarged in a rapid manner to any suitable size without the need for any cumbersome equipment.

Further, the coating produced in accordance with the invention finds particular use in producing a positive image of a negative as explained above. In addition, the coating may also be used in making photographic prints for environments where measurements of infra-red light can be useful. For example, a coated plate can be used to measure the distribution of heat in an insulator for a high voltage light.

The invention can be easily incorporated into commercially available enlargers. However, some enlargers are made in such a way that the focusing mechanism is very large. Should a source of UV light be mounted on the enlarger's head, a focusing mechanism of this kind would be in the path of UV light. In this case, a source of UV light can either be attached to a sort of an extension or mounted to another part of an enlarger that moves in a parallel manner with a source of infra-red light.

A source of UV light could also be mounted to the bottom part of the focusing mechanism. The change of the distance between both sources of light due to focusing would not be very great and for that reason the ratio of the intensities of the two lights on the activated plate would probably be within the working range for most sizes of enlargement.

What is claimed is:

1. A system for viewing black-and-white negatives in positive image form for subsequent printing comprising
    a support frame;
    a housing adjustably mounted on said support frame for movement therealong;
    a white light source mounted in said housing for projecting light in a predetermined path;
    a condensor mounted in said housing in said path;
    a lens system mounted on said housing in said path for passage of the light therethrough;
    a negative mounting means removably mounted in said housing upstream of said lens system relative to said white light source and in said path;
    an infra-red filter mounted on said housing for movement into and out of said path downstream of said lens relative to said white light source lens;
    an ultra-violet light source for projecting ultra-violet light; and
    a plate mounted in said path in spaced relation to said housing for visual viewing, said plate having a luminescent coating thereon to receive ultra-violet light from said ultra-violet light source for activation of said coating and to receive infra-red light from said white light source through said filter for quenching the received ultra-violet light on said plate whereby upon mounting of a black-and-white negative in said negative mounting means and activation of said light sources, a positive reverse image of the negative appears on said plate for viewing.

2. A system as set forth in claim 1 wherein the ultra-violet light source and white light source are mounted in substantially fixed relation to each other to produce a ratio of intensities on said plate of about one-to-one.

3. A system as set forth in claim 1 wherein said white light source has a value of from 30 to 200 watts.

4. A system as set forth in claim 1 wherein said white light source has a value of from 30 to 150 watts and said ultra-violet light source has a value of 4 to 6 watts.

5. A system as set forth in claim 1 wherein said white light source is a 100 watt bulb and said ultra-violet light source is a 6 watt bulb.

6. A system as set forth in claim 1 wherein said ultra-violet light source is mounted on said housing and said housing is adjustably mounted relative to said plate for vertical movement above said plate and said path is vertical.

7. In combination,
    an apparatus for visualization of a positive image of a black-and-white negative on a plate having a luminescent coating thereon, said apparatus including an ultra-violet light source for shedding ultra-violet light on said plate to activate said coating to luminescence, an infra-red light source for projecting light through a negative towards said plate, and an infra-red filter for filtering through infra-red light passing through a negative onto said plate to quench the ultra-violet light on said plate to black out areas thereon corresponding to light areas of the negative, and
    means for producing a photographic enlargement of said positive image of variable size on said plate.

8. The combination as set forth in claim 7 wherein said means for producing a photographic enlargement moves said apparatus and plate relative to each other to produce an enlargement of said positive image.

9. The combination as set forth in claim 7 wherein said means includes an upright support frame and means for adjustably mounting said apparatus on said support frame in a vertical plane.

10. The combination as set forth in claim 7 wherein said apparatus further includes a housing having said light sources fixedly mounted therein.

11. A system for viewing color negatives in positive black-and-white image form comprising
    a support frame;
    a housing adjustably mounted on said support frame for movement therealong;
    a white light source mounted in said housing for projecting light in a predetermined path;
    a condensor mounted in said housing in said path;
    a lens system mounted on said housing into said path;
    a negative mounting means removably mounted in said housing upstream of said lens system and in said path;
    a first filter for passing infra-red radiation of a wave length between approximately 0.5 microns and 1.0 microns in said path;
    a second filter in said path for passing radiation of a wave length longer than approximately 0.7 microns;
    an ultra-violet light source mounted for projecting ultra-violet light; and a plate mounted in said path in spaced relation to said housing, said plate having a luminescent coating thereon to receive ultra-violet light from said ultra-violet light source for activation of said coating and to receive infra-red light from said white light source for quenching the received ultra-violet light on said plate whereby upon mounting of the color negative in said negative mounting means and activation of said light source, a black-and-white positive image of the color negative appears on said plate.

12. A system as set forth in claim 11 wherein said coating has a maximum response in the infra-red spectrum at a wave length of about 0.9 microns for quenching of the luminescene of said coating.

13. A system for visualization of true colors of a color negative having a dark brown-orange cast comprising
a support frame;
a housing adjustably mounted on said support frame for movement therealong;
a white light source mounted in said housing for projecting light in a predetermined path;
a condensor mounted in said housing in said path;
a lens system mounted on said housing in said path;
a negative mounting means removably mounted in said housing upstream of said lens system and in said path;
a blue filter in said path having a light blue tone for passing all visible spectrum and partially absorbing orange-to-red portions of the spectrum;
an ultra-violet light source mounted on said housing for projecting ultra-violet light; and
a plate mounted in said path to receive ultra-violet light from said ultra-violet light source for activation of said coating to emit a yellow-green light and to receive all the visible light and the orange-to-red portions passed through said blue filter to mix with said yellow green light whereby upon mounting of a color negative in said negative mounting means and activation of said light sources a genuine color image of said color negative appears on said plate.

14. A method for obtaining a black-and-white image of a color negative for viewing comprising the steps of
bathing a luminescent-coated plate with ultra-violet light to activate the coating thereon;
projecting light through a color negative towards the activated coating;
filtering said light to pass only infra-red light of a wave length between 0.7 to 1.0 microns onto the activated coating to quench areas of the activated coating corresponding to white areas of the negative while the black areas of the negative absorb said light whereby a black-and-white image is obtained on the plate for viewing.

15. A method of viewing the image of a color negative having an orange-brown cast in genuine form comprising the steps of
bathing a luminescent-coated plate with ultra-violet light to activate the coating thereon;
projecting light through a color negative towards the activated coating;
filtering said light through a blue filter having a light blue tone prior to impingement on the activated coating to pass all visible light and some parts of the orange and red spectrum to mix with a yellow-green light emitted from the activated plate to produce a negative image on the plate of genuine colors contained on the negative by the process of addition.

16. A luminescent coating consisting essentially of zinc sulphide of crystalline form and trace amounts of copper and cobalt in one of a nitrate or chloride form in the crystalline structure of said zinc sulphide, said zinc sulphide being crystallized at a temperature of from 800°C to 1,000°C, said coating being sensitive to infra-red light and wherein said copper is in an amount of about $10^{-3}$ to $10^{-4}$ percent and said cobalt is in the amount of about $10^{-4}$ to $10^{-5}$ percent.

* * * * *